J. B. & J. C. WATT.
Corn Planter.
No. 106,896.
2 Sheets—Sheet 2.
Patented Aug. 30, 1870.
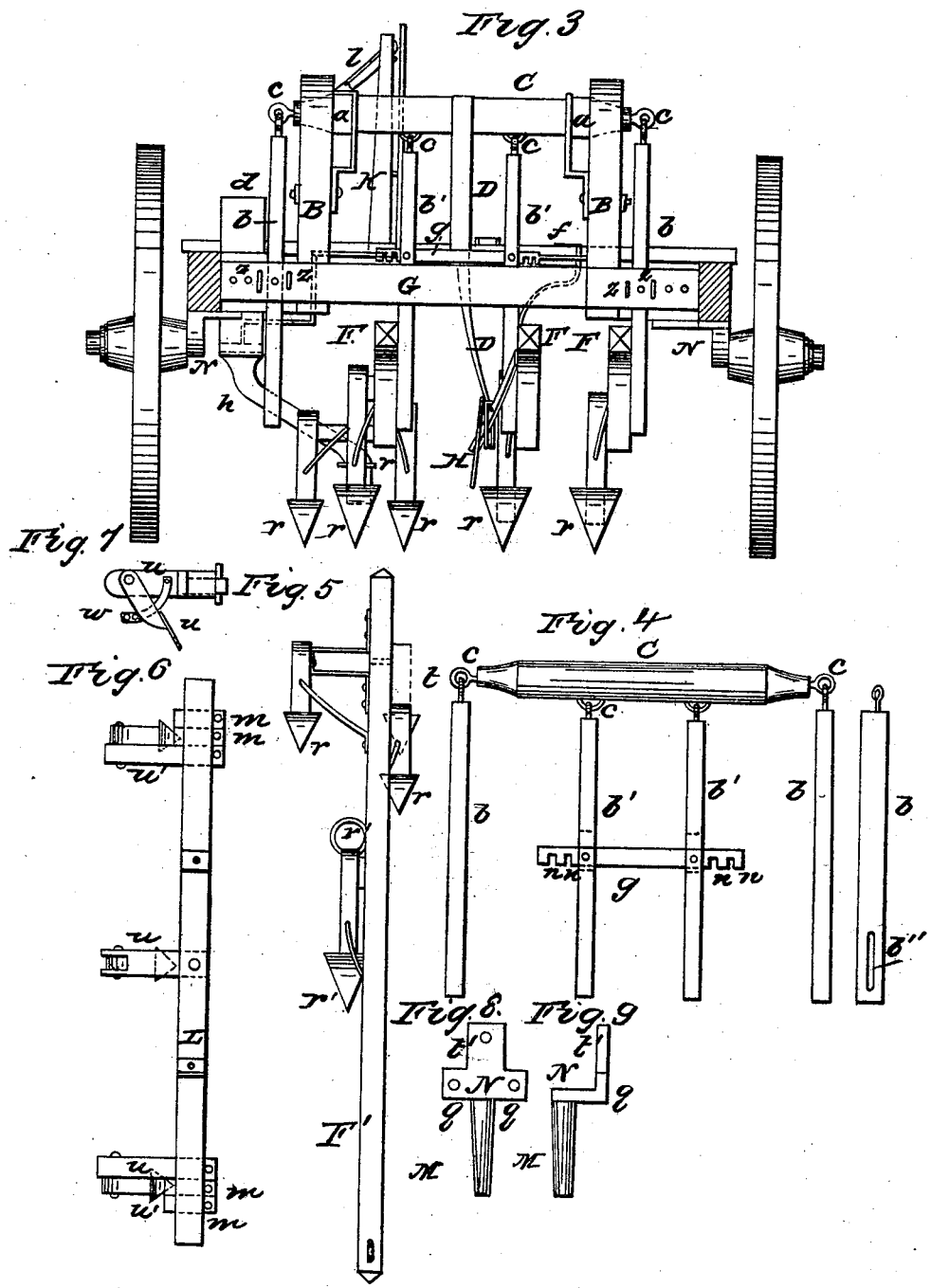

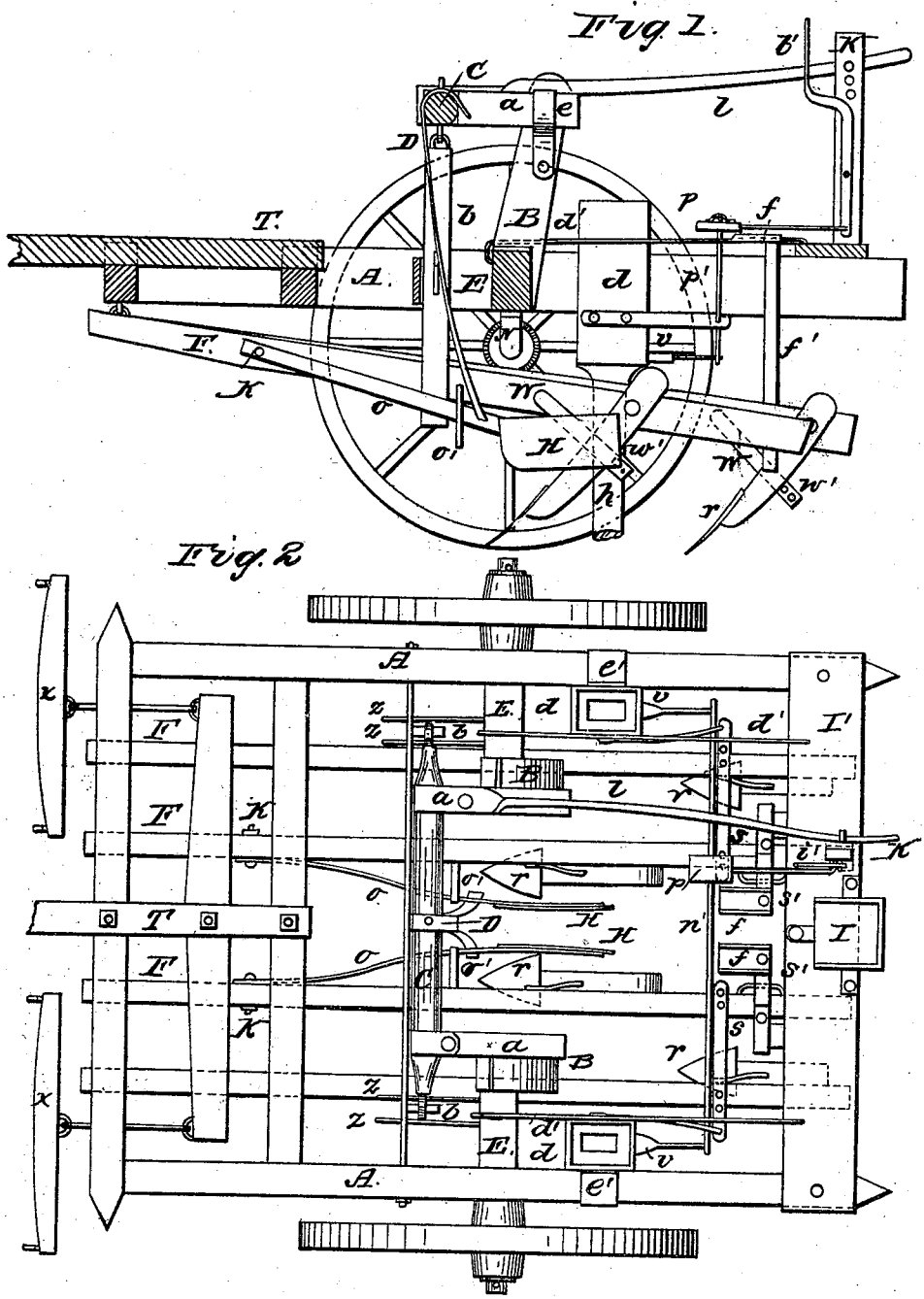

United States Patent Office.

JAMES B. WATT AND JOHN C. WATT, OF GREENE COUNTY, OHIO.

Letters Patent No. 106,896, dated August 30, 1870.

IMPROVEMENT IN SEEDING-PLOWS AND PLANTERS.

The Schedule referred to in these Letters Patent and making part of the same

We, JAMES B. WATT and JOHN C. WATT, of the county of Greene and State of Ohio, have jointly invented certain Improvements in Seed-Plows and Planters, of which the following is a specification.

The first part of our invention consists in the construction of a seed-plow and planter, mounted upon wheels, with a divided center rail, the end sections attached to the side rails, supporting backward inclined posts, to the tops of which is hinged a raising and lowering frame, having short arms projecting forward and attached to a transverse bar, from which depend vertical levers, by link or ring connections, which are attached to the beams of the plows near the middle of their length, forward of the wheel axles. This frame and the plows are raised and lowered by a hand-lever, attached to one of the short arms of the frame, which extends back to a post, with pin-holes, for adjusting it, near the driver's seat, on the rear of the machine. In combination with the raising and lowering mechanism, attached to the plows, is a device for raising and lowering adjustable shields, which are attached inside the cultivating plows, to long levers, extending forward, and flexibly bolted to the plow-beams near the forward ends.

The second part of our invention consists in the construction of gauge-bars, for regulating the spaces between the plows, the principal one extending across the machine just forward of the depending levers which raise the plows, these levers hanging between this gauge-bar and the center-rail sections. Rods or pins pass through holes in the gauge-bar into the center-rail sections for adjusting the width between the outside depending levers and their connecting plows. The inside depending levers have a smaller gauge-bar, with notched ends, connecting them for adjusting the width between the inside plows. The outside and inside plow on each side of the row are coupled at the rear of their beams by other adjustable gauge-bars. Angular foot-levers, for operating the plows, are attached to the seat rail of the bed-frame. When planting, droppers are attached to the bed-frame, with lever connections, operated by hand or foot. The axle-plates, upon which the bed-frame rests, are T-shaped, the longer part extending under the sectional portions of the center rail for strengthening that part of the bed-frame which supports the posts, frame, and attachments which raise and lower the plows.

The third part of our invention consists in the construction of fenders or shields, attached to the forward part of the plow-beams by long levers, and sustained by slotted guides, in which they can be raised and lowered to suit corn of uneven height; also in making the planting-plows adjustable to different points on the beams, so that the plows can be set alternately or in line, to suit the ground when rough or smooth.

The fourth part of our invention consists in the attachment of a cross-beam to the rear of the plow-beams, having markers hinged thereto, and made adjustable by blocks and pins.

Figure 1 is a sectional elevation of a machine embodying our improvement.

Figure 2 is a plan view of the same machine.

Figure 3 is a front view of a sectional elevation of the bed-frame of the machine, showing the planting-plows and dropper attachment on the left, the cultivating-plows on the right, and the raising and lowering mechanism; also, the strap D, attached to the shield lever o, suspended from the transverse bar C; also, the gauge-bars G and g.

Figure 4 shows the transverse bar C, with the suspended levers b b and b' b'; the latter connected by the gauge-bar g; also, a side view of one of the bars.

Figure 5 is a plan view of one group of planting-plows, showing the rear plow r on the right, as adjusted into line with that on the left, by the dotted lines t; also, the ring r', in the rear of the forward plow, attached to beam F, for the reception of the dropper-hose.

Figure 6 is a plan view of the cross-beam L and markers u u.

Figure 7 is a cross-section of the same.

Figures 8 and 9 show plan and section of axle-plates.

A is the bed-frame of the machine.

B the inclined posts, which support the raising and lowering-frame, shown in fig. 4;

C being the transverse bar, framed to the forward projecting arms a, fig. 1, and furnished with the ring or eye-bolt connections c c, by which the vertical levers b b and b' b' are suspended.

These ring connections permit easy adjustment of the width between the plows, as well a free lateral movement of the same, when operated by the foot-levers f, seen in figs. 1 and 2.

D is a forked strap, which is attached at its lower ends to the shield-levers o, working in guides o' o', and passes up over the transverse bar C, within reach of the driver.

In using the machine as a cultivator or plow, this strap is operated to raise and lower the shields H, so that the danger of crushing young corn from rolling clods is entirely prevented.

The divided center rail sections are shown at E.

F F are the plow-beams.

The levers o, attached to the shields H, are flexibly bolted to the plow-beams at k, figs. 1 and 2.

G is the large gauge-bar, extending across the bed-frame A, and permanently secured to the same. This may be made of wood or metal.

A series of holes, seen in this gauge-bar near its ends, is made for adjusting the spaces between the outside plows, by means of the pins $z\ z$, which are passed through the gauge-bar, on each side of the outside suspended vertical levers $b\ b$, into the center rail sections E.

I is the seat for the driver, fastened upon the seat-rail I'.

K is a post on the seat-rail I', with pin-holes in it for adjusting hand-lever $l$, attached to the raising and lowering mechanism.

L represents a cross-beam, with markers $u'\ u'$ attached to the same by the short arms $u\ u$.

These markers are made adjustable upon the cross-beam by blocks $m\ m$, fitting in slots, in which the tenons of the arms $u\ u$ are inserted.

These blocks and the arms are held in place by pins, as seen in fig. 6.

N N are axle-plates, seen in the plan and sectional views, figs. 8 and 9.

The axle M and plate N are forged in one piece, and bolted to the under side of the bed-frame A, the long arm $t'$ extending under the section of the center rail E, which is left attached to the side rail, for the purpose of supporting posts B and the raising and lowering frame attached to them.

$d\ d$ are the dropper-boxes, attached to the side rails by clips $e'\ e'$.

The valves $v\ v$, on each side, as shown in fig. 2, are connected, the lever $n$ extending from one to the other.

A foot-piece, $p$, is mounted upon this lever to operate it by the foot. This foot-piece has a ring on one end of it, connecting it with the hand-lever $l'$, figs. 1 and 2.

The droppers are operated simultaneously by using either the foot or hand, as may be desired, the foot piece $p$ having a strap for holding the foot, so that the lever $n'$ can be drawn back, as well as thrown forward in operating it. The hand-lever $l'$ is bent for conveniently working the lever $n'$ in the same way.

When the machine is used as a plow or cultivator, the droppers and attachments are taken off, the rods $d'$, which attach them to the bed-frame, extending from center rail sections E E to rear, or seat-rail I being easily removed by slipping their ends out of the holes in the rear or seat-rail, and pushing them forward, their forward ends being bent over and inserted into holes in the front side of the center rail sections.

The foot-levers $f\ f$ are attached to the front edge of the seat-rail I' by pivot bolts. They have the levers $f'\ f'$, which extend from them to operate the plows, bent inward and downward, passing through loops $s'\ s'$, on the rear of the plow-beams F, as seen in fig. 2.

The suspending levers $b\ b$ and $b'\ b'$ have a slot, $b''$, in their lower ends, for adjusting them upon the plow-beams, and regulating the depth of the plows.

When it is desired to allow the plows to work independently of the raising and lowering mechanism, the bolts which pass through the slots in the lower ends of the suspending levers are simply unscrewed sufficiently to allow them to slide freely up and down with the undulations of the beams.

The gauge-bar $g$, seen in figs. 3 and 4, has notches $n\ n$, for adjusting the width between the vertical levers $b'\ b'$ and the inside plows, to which they are connected.

The coupling-bars $s\ s$, on the rear of plow-beams F F, fig. 2, are used when it is desired to operate the pairs, together with the foot-levers $f\ f$, thus shifting the four shovels at one motion.

The cross-beam L is bolted to the rear ends of the plow-beams F F, and the depth of the markers regulated the same as the plows, the usual wear of bolts and screws being entirely obviated by the use of the raising and lowering mechanism.

In using our machine in rough or stumpy ground, by loosening the bolts attaching the vertical suspending-bars to the plows, and removing the coupling-bars $s\ s$ on the rear of the beams, either plow meeting an obstruction is raised up independently of the other.

The advantage of flexibly attaching the fenders or shields H H by the long levers $o\ o$ is seen in plowing uneven corn, where it has been replanted, and in parts of the field it is large and in parts small.

The slotted guides $o'\ o'$, through which the levers $o\ o$ extend, prevent the shields from being forced inward by any outside pressure of clods or earth. They are attached to plow-beams F, and are bent to suit the motion of levers $o\ o$.

Gauge-bar $g$ is notched at both ends, to fit over pins in the vertical levers $b'\ b'$, and loosely connects them, so that it may be easily removed in working between the beams of the plows, in adjusting or otherwise.

The advantage of attaching the foot-levers $f\ f$ on the rear rail of the machine so high as not to interfere with the corn, is readily seen, and will be appreciated by farmers who have had their corn injured in cultivating it with machines having the foot-levers suspended under the frame.

Having described our invention,

What we claim, is—

1. Center-rail sections E, in combination with posts B, substantially as shown and described, for the purpose hereinbefore set forth.

2. Strap D, in combination with the transverse bar C, levers $o$, guides $o'$, and shields H, substantially as shown and described, for the purpose specified.

3. The combination of the backward inclined posts B, frame $a, c$, vertical levers $b\ b, b'\ b'$, gauge-bars G $g$, plow-beams F, levers $o$, guides $o'$, fenders or shields H, and strap D, substantially as shown and described, for the purpose specified.

4. Shifting foot-levers $f$, in combination with rear rail I', loops $s'\ s'$, plow-beams F, and coupling-bars $s\ s$, substantially as shown and described, for the purpose specified.

5. The adjustable parts $t$, on planting plow-beam F', substantially as shown and described, for the purpose hereinbefore set forth.

6. Rods $d'$, in combination with droppers $d$, lever $n'$, foot-piece $p$, and hand-lever $l'$, substantially as shown and described, for the purpose specified.

7. Cross-beam L, markers $u'$, arms $u$, and blocks $m$, substantially as shown and described, for the purpose specified.

JAMES B. WATT.
JOHN C. WATT.

Witnesses:
GEO. S. ORMSBY,
S. H. HYPES.